United States Patent [19]
Abe

[11] Patent Number: 5,790,965
[45] Date of Patent: Aug. 4, 1998

[54] DIAGNOSIS SYSTEM APPLICABLE TO SEVERAL TYPES OF ELECTRONIC CONTROL UNITS FOR MOTOR VEHICLES

[75] Inventor: Kunihiro Abe, Higashi-Murayama, Japan

[73] Assignee: Fuji Jukogyo Kabushiki Kaisha, Tokyo, Japan

[21] Appl. No.: 554,226

[22] Filed: Nov. 8, 1995

[30] Foreign Application Priority Data

Nov. 14, 1994 [JP] Japan ................... 6-279505

[51] Int. Cl.$^6$ .................................................. G06F 13/00
[52] U.S. Cl. ...................... 701/29; 307/10.1; 701/33
[58] Field of Search ................ 364/423.098, 424.034,
364/424.038, 424.04, 550, 551.01; 395/500,
285, 286; 701/1, 29, 33, 35; 307/10.1; 340/428,
438, 439, 146.2

[56] References Cited

U.S. PATENT DOCUMENTS

| | | | |
|---|---|---|---|
| 4,831,560 | 5/1989 | Zaleski | 364/551.01 |
| 4,962,456 | 10/1990 | Abe et al. | 364/551.01 X |
| 4,975,846 | 12/1990 | Abe et al. | 364/551.01 X |
| 4,975,847 | 12/1990 | Abe et al. | 364/551.01 X |
| 5,003,477 | 3/1991 | Abe et al. | 364/551.01 X |
| 5,132,905 | 7/1992 | Takai et al. | 364/424.038 |
| 5,278,759 | 1/1994 | Berra et al. | 364/423.098 |
| 5,416,917 | 5/1995 | Adair et al. | 395/500 |
| 5,555,498 | 9/1996 | Berra et al. | 364/424.038 |

Primary Examiner—Michael Zanelli
Assistant Examiner—Edward Pipala
Attorney, Agent, or Firm—Beveridge, DeGrandi, Weilacher & Young, LLP

[57] ABSTRACT

A diagnosis system has a main circuit for executing diagnosis by data communication with an electronic control unit installed in a vehicle using data read out of the control unit. The system has an interface circuit that converts input and output signal levels on the main circuit sent from and to the control unit into signal levels that match signal levels in the control unit. The interface circuit has a comparator and a transistor. A signal sent from the control unit and pulled up with a supply voltage supplied to the control unit is applied to the comparator at its inverting input terminal. A reference signal based on the supply voltage is also applied to the comparator at its non-inverting input terminal. An output signal of the comparator is applied to the main circuit. The transistor is supplied with the supplied voltage via a resistor at its collector. The transistor receives at its base an output signal of the main circuit. A signal appearing at the collector is applied to the control unit. The system also has a switch provided on the main circuit. A supply voltage supplied to the interface circuit is switched between the supply voltage supplied to the control unit and a supply voltage supplied to the main circuit.

5 Claims, 6 Drawing Sheets

DIAGNOSIS SYSTEM APPLICABLE TO SEVERAL TYPES OF ELECTRONIC CONTROL UNITS FOR MOTOR VEHICLES

BACKGROUND OF THE INVENTION

The present invention relates to a diagnosis system for a vehicle with data read out of an electronic control unit installed in the vehicle. Particularly, this invention relates to a diagnosis system applicable to several kinds of electronic control units that operate on different signal levels.

Recently, an electronic control unit of an automobile has become more complicated. What is essential for diagnosing such vehicles is the diagnosis system that can easily read out data of electronic control units installed in the vehicles.

This diagnosis system is mainly designed for portability and general purposes. A car mechanic thus can easily check the control system of the automobile. Most diagnostic systems are equipped with a memory cartridge detachable to the system. The memory cartridge contains a recording medium that stores diagnostic programs corresponding to kinds, types of automobiles manufactured in specific years, etc. The diagnostic system with the memory cartridge makes data communication with the electronic control unit in the automobile with the data read therefrom. Such a system, or diagnosis equipment is disclosed by Japanese Patent Laid-Open No. 1-210844.

There are many kinds of electronic control units installed in automobiles. These units employ different kinds of communications systems and communications interfaces. Car manufacturers provide electronic control units that operate on different signal levels for many kinds of automobiles. These situations force repair shops to prepare any diagnosis equipment with hardware applicable to different signal levels for each manufacturer or type of an electronic control unit. Preparing the equipment for each communications system is economically very hard for the repair shops.

To solve such a problem, Japanese Patent Laid-Open No. 3-111733 discloses signal converting adapters detachable to a data processing circuit in diagnosis equipment. This makes exchangeable a circuit portion of the diagnostic equipment for data communication with a control system of an automobile.

However, one kind of diagnosis equipment requires several additional pieces of hardware. This results in a higher total production cost. Further, this causes mis-diagnosis at a repair shop due to erroneous attachment of additional hardware for data communication to the diagnosis equipment. Such erroneous attachment often occurs when exchanging diagnostic programs for different kinds of automobiles, types of automobiles manufactured in specific years, etc.

SUMMARY OF THE INVENTION

An object of the present invention is to provide a diagnosis system suitable for any electronic control units with different signal levels installed in vehicles.

According to the present invention, there is provided a diagnosis system for a motor vehicle having various sensors for detecting operating conditions of the vehicle and for generating vehicle operating signals, an electronic control unit responsive to the vehicle operating signals for controlling the vehicle and for producing control signals, various actuators and indication lamps responsive to the control signals for operating the vehicle in an optimum condition corresponding to each of the operating conditions, the system reading out data in the electronic control unit and for transmitting the data and further having diagnosing means responsive to the control signals for diagnosing the electronic control unit by comparing the transmitted data with normal data stored in a memory, and a memory cartridge detachable to the diagnosing means, for storing various diagnosis programs and communication protocols, the diagnosis system comprising: a first interface circuit provided in a memory cartridge and directly connected to the electronic control unit for matching a logic function corresponding to each control signal and for generating a communications signal; memory means for storing various kinds of logic programs; an in-system programmer responsive to the communications signal for controlling the memory means by reprogramming logical functions of the first circuit with design information so as to precisely diagnose the vehicle at a high speed without changing the memory cartridge for various types of the electronic unit; and a second interface circuit interposed between the memory means and the memory cartridge for converting input and output signal levels sent from and to the electronic control unit into signal levels that match other signal levels in the electronic control unit.

The diagnosis system may further include a comparator with an inverting input terminal supplied with an input signal sent from the electronic control unit and pulled up with a supply voltage supplied to the electronic control unit and a non-inverting input terminal supplied with a reference signal based on the supply voltage, the comparator comparing the input and the reference signals to change the input signal into an output signal of the comparator that is applied to the diagnosing means; and a transistor with a base and a collector that is supplied with the supply voltage via resistor, an output signal of the diagnosing means applied to the base being changed into a signal appearing at the collector that is applied to the electronic control unit.

The diagnosis system may further include means for switching a supply voltage supplied to the second interface circuit between a first supply voltage supplied to the electronic control unit and a second supply voltage supplied to the diagnosing means. The switching means may include a jumper wire or wiring pattern for switching the supply voltage to the interface circuit between the first and second supply voltages.

The diagnosis system may further include a recording medium provided in the memory cartridge, for storing diagnosis programs executed by the diagnosing means.

DETAILED DESCRIPTION OF THE PREFERRED EMBODIMENTS

Preferred embodiments according to the present invention will be described with reference to the attached drawings.

Figure 1:
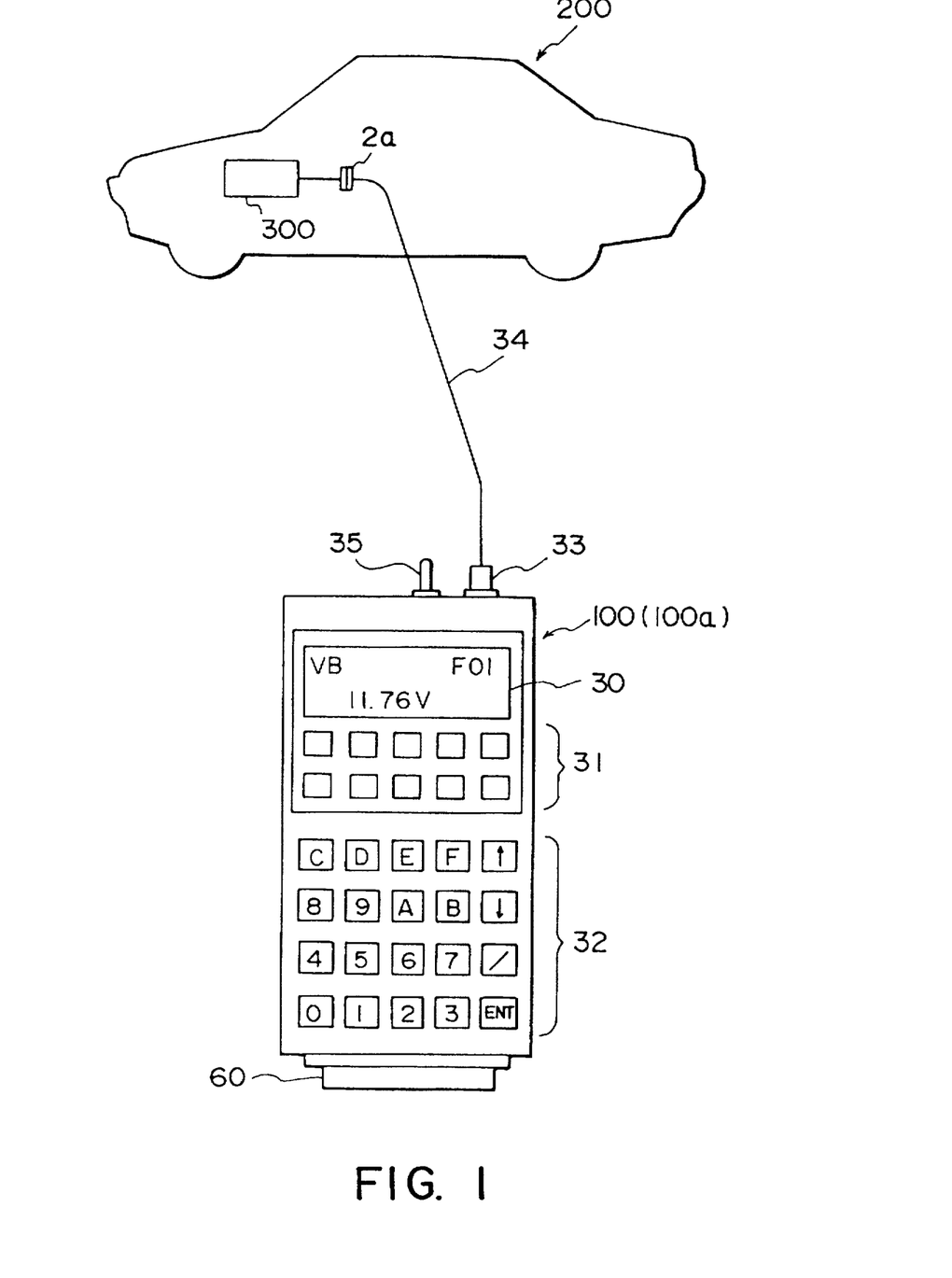
FIG. 1 shows a front view of diagnosis equipment connected to an electronic control unit installed in an automobile, according to the present invention.

FIG. 1 shows a front panel of a portable diagnosis equipment 100 according to the present invention. The diagnostic equipment 100 is connected to an electronic control unit 300 installed in an automobile 200 for diagnosis. Provided on the front panel are a liquid crystal display screen 30, an indicator 31 of light emitting diodes and a keyboard 32. An input/output connector 33 and a power switch 35 are provided on top of the diagnostic equipment 100. An adaptor harness 34 is extending from the input/output connector 33. A memory cartridge 60 is inserted in the lower part of the diagnostic equipment 100. The cartridge 60 will be described later.

To diagnose any fault occurring in the electronic control unit 300: first, connect the adaptor harness 34 to a connector 2a of the control unit 300; second, turn on the power switch 35; third, enter specific keys on the keyboard 32; and lastly, execute diagnosis while looking at displays on the display screen 30.

Figure 2:
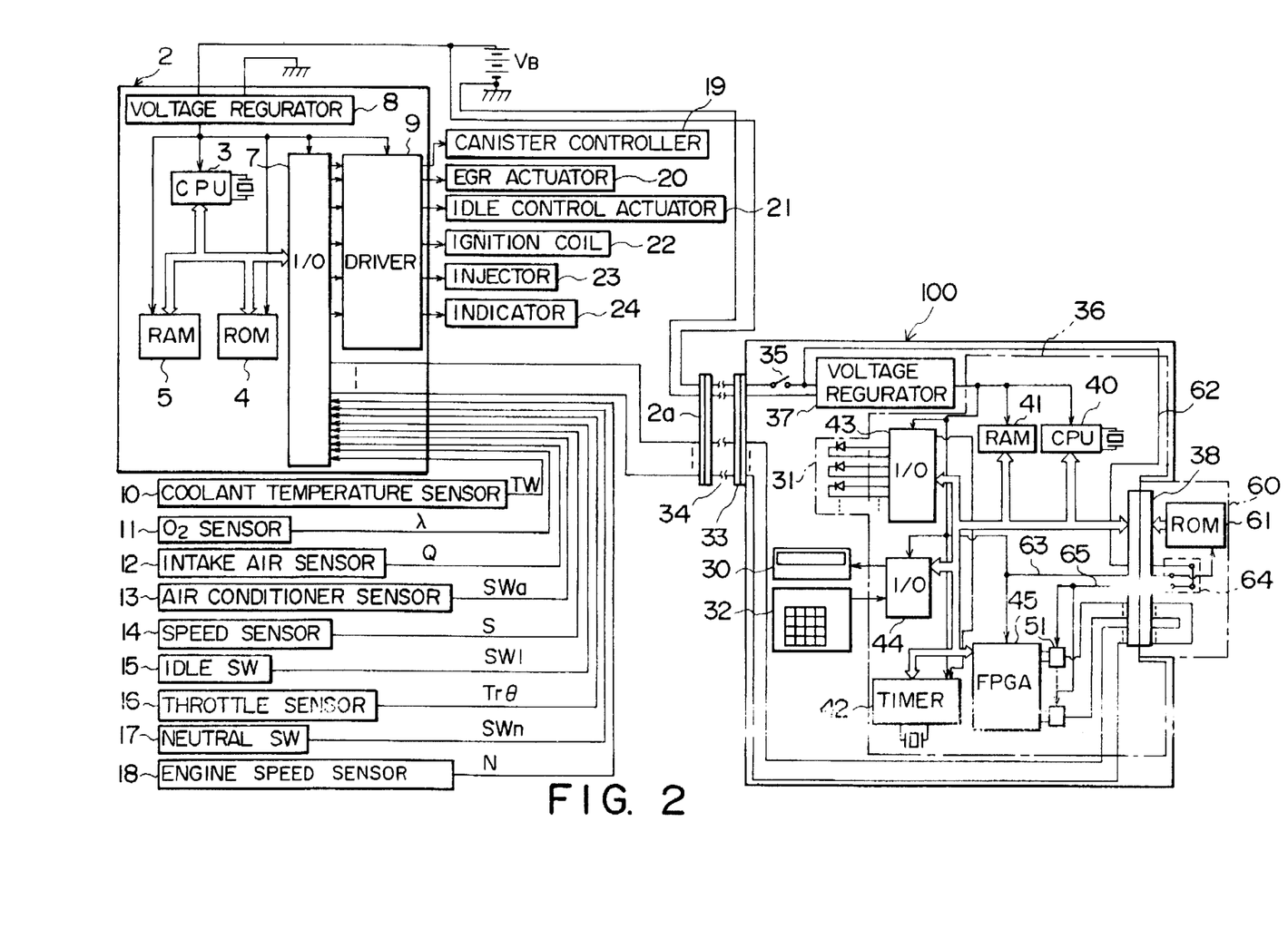
FIG. 2 shows circuit block diagrams of the electronic control unit and the diagnosis equipment as the first preferred embodiment according to the present invention.

The preferred embodiments employ an engine control unit (ECU) 2 to be diagnosed as the electronic control unit 300 as shown in FIG. 2. Besides engine control, the electronic control unit 300 may be used for: power train control of an engine, an automatic transmission, etc.; vehicle body control, such as air conditioning and several information guidance systems; vehicle control, such as suspension control and auto-cruising, etc.

As shown in FIG. 2, The engine control unit 2 is a microcomputer with a voltage regulator 8 that supplies predetermined constant voltages to the circuitry and a driver 9. The microcomputer includes: a CPU 3 as a main arithmetic unit; a ROM 4 that stores predetermined data, such as an engine control program and several memory maps; a RAM 5 that stores data obtained by processing output signals of several sensors; an input/output interface 7 to which these output signals are supplied and which supplies control signals to several actuators. Via buses, these components are connected to each other.

Data signals applied to the input/output interface 7 are: a coolant temperature signal TW produced by a coolant temperature sensor 10; a lean/rich signal $\lambda$ of an air-fuel ratio produced by an oxygen sensor 11; an intake air quantity signal Q produced by an intake air sensor 12; an ON/OFF signal SWa of an air conditioner switch 13; a vehicle speed signal S produced by a speed sensor 14; an ON/OFF signal SW1 of an idle switch 15; a throttle signal Tr$\theta$ produced by a throttle sensor 16, the signal Tr$\theta$ representing how a throttle is opened or closed; an ON/OFF signal SWn of a neutral switch 17; and an engine speed signal N produced by an engine speed sensor 18.

These data signals are processed by the CPU 3 and written into the RAM 5 for control quantity computation. The CPU 3 reads the data from the RAM 5 to compute several control quantities, such as a fuel injection pulse width and an ignition timing. The CPU 3 produces the control signals corresponding to the control quantities. The control signals are supplied to the driver 9 via input/output interface 7 at predetermined timing.

Connected to the driver 9 are: a canister controller 19 for controlling canister purge quantity; an EGR actuator 20 for controlling EGR quantity; an idle control actuator 21 for controlling an idle rotation number; an ignition coil 22 for supplying a high voltage to an ignition coil to ignite ; and an injector 23 for injecting fuel into an engine. The driver 9 drives these components with the control signals supplied thereto via input/output interface 7 to control the engine in each driving zone.

Also connected to the driver 9 is a self-diagnostic indicator 24 for notifying faults when discovered by self-diagnostic function. The indicator 24 has a set of lamps which are flicked by predetermined times or turned on in a predetermined manner. These light indications respond to trouble codes read out of the ROM 4 and that correspond to fault portions.

The RAM 5 has a backup RAM that is supplied with subsidiary power supply from a battery $V_B$ via voltage regulator 8 after the main power is removed. The backup RAM stores values obtained by learning, trouble codes corresponding to fault portions, etc.

The diagnosis equipment 100 is suitable for use at a repair shop in a car dealer, for instance. The diagnostic equipment 100 includes a controller 36 (microcomputer) and a voltage regulator 37. Connected to the voltage regulator 37 is the power switch 35 which is further connected to the battery $V_B$ via adapter harness 34. The detachable memory cartridge 60 with a ROM 61 is inserted into the controller 36 via connecter 38.

The controller 36 in the first preferred embodiment includes a CPU 40 as a main processor, a RAM 41, a timer 42 for generating a synchronizing signal, I/O interfaces 43 and 44, a communications interface (which will be described later). Via buses, these components and the ROM 61 of the memory cartridge 60 are connected to each other. The output signals of the sensors and switches of the ECU 2 are supplied to the I/O interface 43 via input/output interface 7. In response to the output signals, the I/O interface 43 generates signals to turn on the LEDs of the indicator 31. The LEDs indicate ON or OFF situations of the sensors and switches. A key entry on the keyboard 32 generates signals that are supplied to the I/O interface 44. The interface 44 generates signals that are supplied to the display screen 30.

The present invention employs a Field Programmable Gate Array (FPGA) 45 as the communications interface. The FPGA 45 is of a semiconductor integrated circuit with reprogrammable logical functions. These functions can be reprogrammed on board with supply of design information applicable to a communications protocol of the ECU 2.

Figure 3:
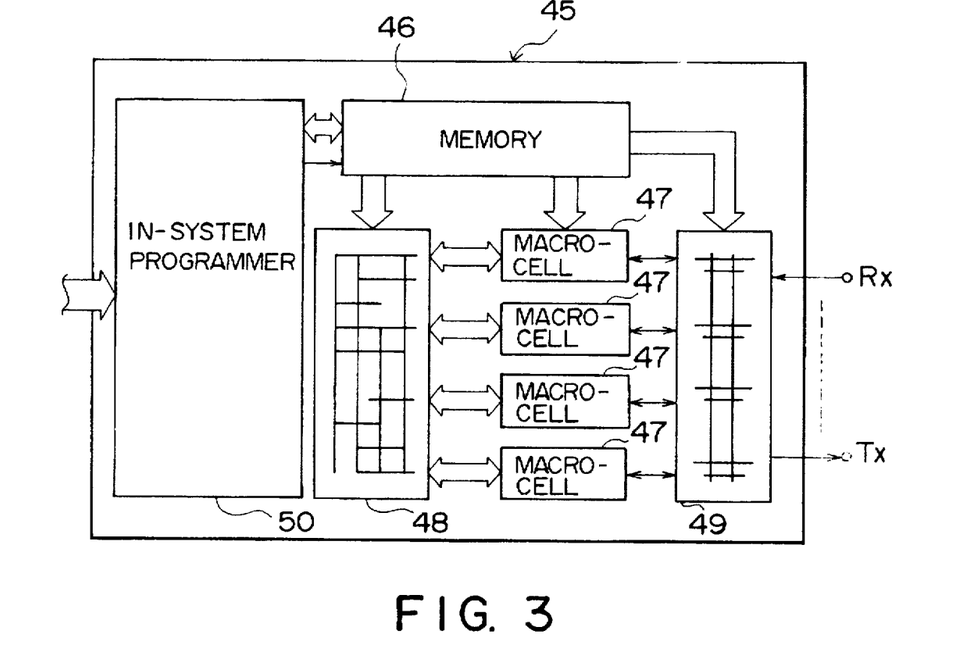
FIG. 3 shows a circuit block diagram of FPGA 45 shown in FIG. 2.

As shown in FIG. 3, the FPGA 45 includes: a memory 46 that stores programmed contents; macro-cells 47 the logical functions of which depend on the contents of the memory 46; a logical wiring block 48 that inter-connects the macro-cells 47 with data from the memory 46; an I/O wiring block 49 for making the macro-cells 47 acceptable to external input/output signals; and an in-system programmer 50 for managing the memory 46. The memory 46 is either of a SRAM type volatile memory or an EEPROM type non-volatile memory data of which is electrically erasable.

Figure 4:
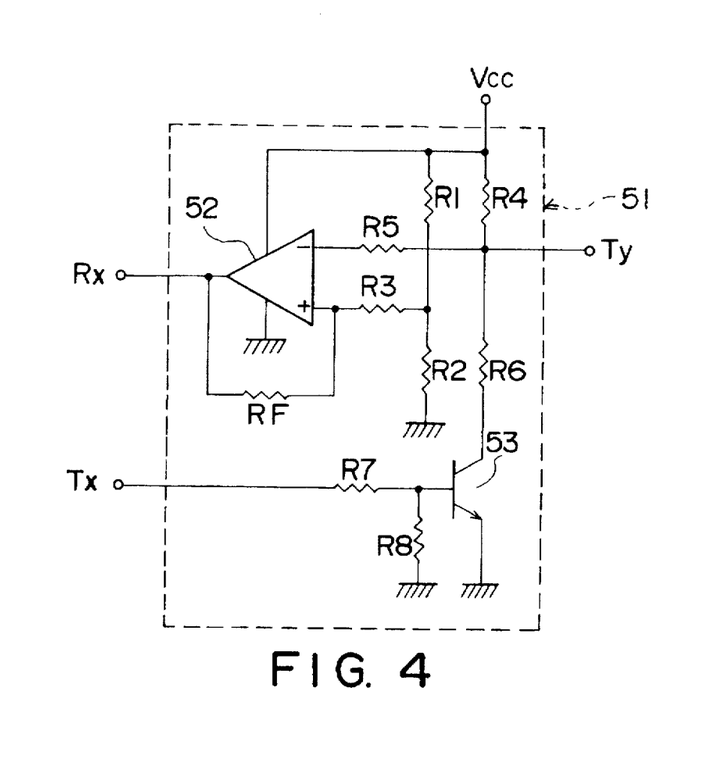
FIG. 4 shows a circuit diagram of the interface cell 51 shown in FIG. 2.

Connected to the FPGA 45 at its input and output are a plurality of interface cells 51 one of which is shown in FIG. 4. The interface cells 51 are employed as an interface to adjust signal levels processed by the CPU 40, to those in the control system installed in an automobile. Data communication can be made between the control system on the automobile and diagnosis equipment 100 via interface cells 51. This is done even though the control systems installed in the automobile and the diagnostic equipment 100 are different in supplied voltage.

As shown in FIG. 4, the interface cell 51 includes an open-collector type comparator 52 and a common-emitter NPN transistor 53. The comparator 52 is driven with a current and voltage in a wide range from low to high beyond a voltage given by the battery $V_B$ (FIG. 2), for example about 4 to 16 volts. A voltage Vcc of the control system on the automobile is supplied to the comparator 52.

Further, a Schmitt-type hysterisis comparator is employed as the comparator 52 with a feedback resistor RF. Applied to its non-inverting input terminal is a reference voltage via resistor R3. The reference voltage is obtained by dividing the voltage Vcc of the control system by resistors R1 and R2. Applied to its inverting input terminal is a signal Ty from the control system installed in the automobile via resistor R5. The signal Ty is pulled up with the voltage Vcc via resistor R4. An open corrector output of the comparator 52 is supplied to the FPGA 45 of the diagnosis equipment 100 as a signal Rx as shown in FIG. 3.

A signal Tx sent from the FPGA 45 is supplied to the base of the transistor 53 via resistors R7 and R8. This causes the signal Ty pulled up with the voltage Vcc via resistor R4 to flow into the corrector of the transistor 53 via resistor R6. This results in the signal Tx from the FPGA 45 flowing into the control system on the automobile as the signal Ty.

A voltage of 5 volts is supplied from the voltage regulator 37 to the control system of the diagnosis equipment 100. This voltage is employed in general digital circuits. Most control systems on automobiles also employ a voltage of 5 volts as Vcc. However, some control systems on automobiles employ a voltage of 12 volts corresponding to the battery voltage $V_B$. For such a voltage, the diagnostic equipment 100 includes two power lines 62 and 63 as shown in FIG. 2. The power line 62 carries a voltage of 12 volts from the battery $V_B$. The power line 63 carries a voltage of 5 volts from the voltage regulator 37. Both lines are connected to the memory cartridge 60 via connector 38.

The memory cartridge 60 is to make the diagnosis equipment 100 flexible for general use, or applicable to different diagnostic items, car types, communications protocols, etc. For this purpose, the ROM 61 stores a diagnosis boot program for the CPU 40, a diagnostic program for an electronic control unit (ECU 2) of a specific automobile, and logical data for reprogramming the FPGA 45. The ROM 61 does not necessarily store the boot program. A read only memory storing the boot program may be installed in the controller 36.

The memory cartridge 60 further includes a switch 64 for switching the power lines 62 (12 V) and 63 (5 V). The input and output signal lines of the interface cells 51 as shown in FIG. 4 are connected to the memory cartridge 60.

Besides the power lines 62 (12 V) and 63 (5 V), connected to the switch 64 is a power line 65 that carries the voltage Vcc of the control system on the automobile to the interface cells 51. The switch 64 switches the power lines 62 and 63 with a wiring pattern or jumper wire so as to match the voltage level of the control system on the automobile. The switched voltage is supplied to the interface cells 51 via power line 65.

FIG. 2 shows the case where the control system on the automobile employs a voltage of 12 volts as a supply voltage. The power line 62 is connected to the power line 65 via switch 64. The power line 62 can be connected to a power line of the voltage regulator 8 via switch 35 when the ECU 2 employs a voltage of 8 volts or another as a supplied voltage. The diagnosis equipment 100 is applicable to any control systems installed in automobiles when a supply voltage of the control system is within an operational voltage range of the interface cells 51.

To diagnose any faults, insert the memory cartridge 60 with the ROM 61 into the diagnosis equipment 100. The ROM 61 stores the diagnostic program for the engine control unit (ECU) 2 of a specific automobile and design data. The diagnostic equipment 100 is initialized and the design data stored in the ROM 61 is transferred to the FPGA 45. The FPGA 45 is reprogrammed with the design data to be applicable to the diagnostic program and communications protocol for the ECU 2 of the automobile 200. Communication between the ECU 2 and FPGA 45 is thus made possible.

Figure 5:
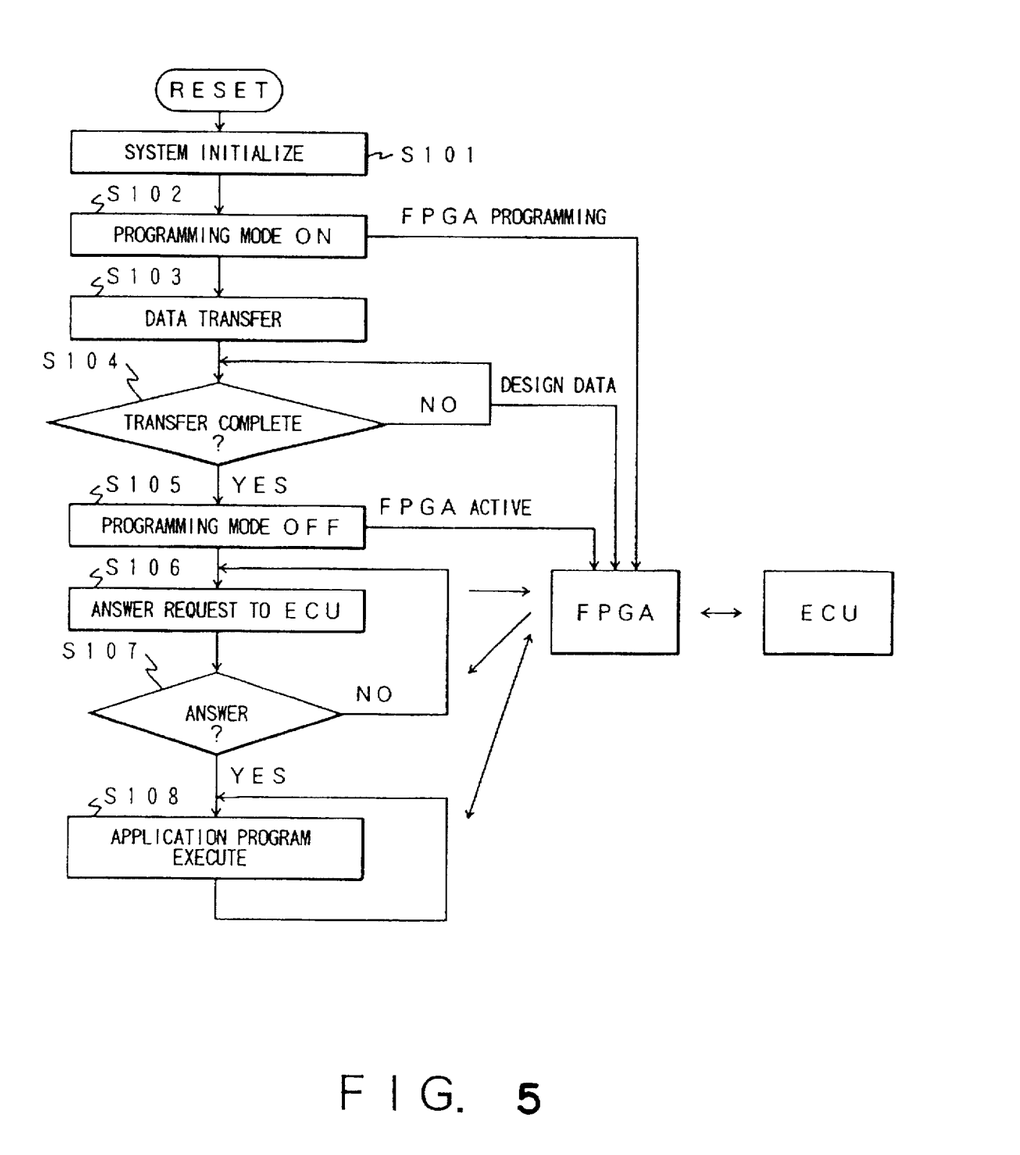
FIG. 5 is a flowchart explaining the process of data communication and diagnosis in the first embodiment.

The flowchart shown in FIG. 5 will describe the process of the diagnosis operation with the diagnosis equipment 100.

To execute the process: first, connect the diagnostic equipment 100 with the memory cartridge 60 to the ECU 2 via adapter harness 34; and next, turn on the power switch 35 to reset the CPU 40 that governs the entire system of the diagnosis equipment 100. The entire system is thus initialized (STEP S101).

The initialization turns on the programming mode of the FPGA 45 in STEP S102. In the case where the memory 46 (FIG. 3) of the FPGA 45 is an EEPROM, its data must be erased beforehand. In STEP S103, the design data for forming communications interface applicable to the communications protocol of the ECU 2 is read out of the ROM 61 of the memory cartridge 60. The design data is transferred to the FPGA 45.

In STEP S104, a check is made of whether the transfer of all design data is completed. If not completed, the data transfer in STEP S103 is continued. If completed, the programming mode of the FPGA 45 is turned off in STEP S105.

In the FPGA 45 as shown in FIG. 3, the logical functions of the macro-cells 47 are decided by the in-system programmer 50. This decision is made in accordance with the design data stored into the memory 46 while the programming mode is ON. Further, the logical wiring block 48 and the I/O wiring block 49 are inter-connected with the connecting information. When the data transfer is completed, the FPG45 is formed as the communications interface applicable to the communications protocol of the ECU 2. The FPGA 45 then becomes active to make possible the communication between the CPU 40 and ECU 2 in the programming mode OFF.

In STEP S106, the FPGA 45 transmits an answer request to the ECU 2 under the communications protocol of the ECU 2. The interface cells 51 convert and transmit the answer request into a signal of 12 volts that matches a signal level of the control system of the ECU 2.

The process goes to STEP S107 which is an answer waiting mode. The ECU 2 receives the answer request signal of 12 volts and transmits reply data. The reply data is converted into a signal of 5 volts by the interface cells 51. The converted signal is then supplied to the FPGA 45 and to the CPU 40 via bus line.

When the CPU 40 receives the answer in STEP S107, the CPU 40 executes a diagnosis program in STEP S108. While the program is running, a message representing that diagnosis is ready to start is displayed on the display screen 30. The process goes in key entry waiting mode.

To check a battery voltage, for example, an operator enters battery voltage diagnostic mode keys, such as "F", "0", "1", and "ENT" on the keyboard 32. This diagnostic mode is interpreted by the CPU 40 that transmits a request for battery voltage data to the ECU 2 via FPGA 45.

In reply to the request, the ECU 2 searches an address corresponding to the request in the RAM 5 to read out data. This data is transmitted to the diagnosis equipment 100.

On receiving, the diagnostic equipment 100 executes data processing, such as binary-to-decimal conversion. The processed result is displayed on the display screen 30. The operator checks the battery voltage through the display and continues diagnosing other items with corresponding key entry if desired.

As described above, the diagnosis equipment according to the first embodiment can be used for any electronic control units. The electronic control units may have different communications protocols with different data formats, transmission and reception timings, etc., and different signal levels. There is no need for preparing other diagnosis equipment with different hardware for communications protocols and signal levels of electronic control units. This results in highly efficient diagnosis operations.

The design data for the FPGA 45 is not necessarily stored in the ROM 61 of the memory cartridge 60. Such data can be loaded to the FPGA 45 from an external computer with modification of the boot program of the CPU 40.

Next, the second preferred embodiment of the diagnosis system according to the present invention will be explained.

Figure 6:
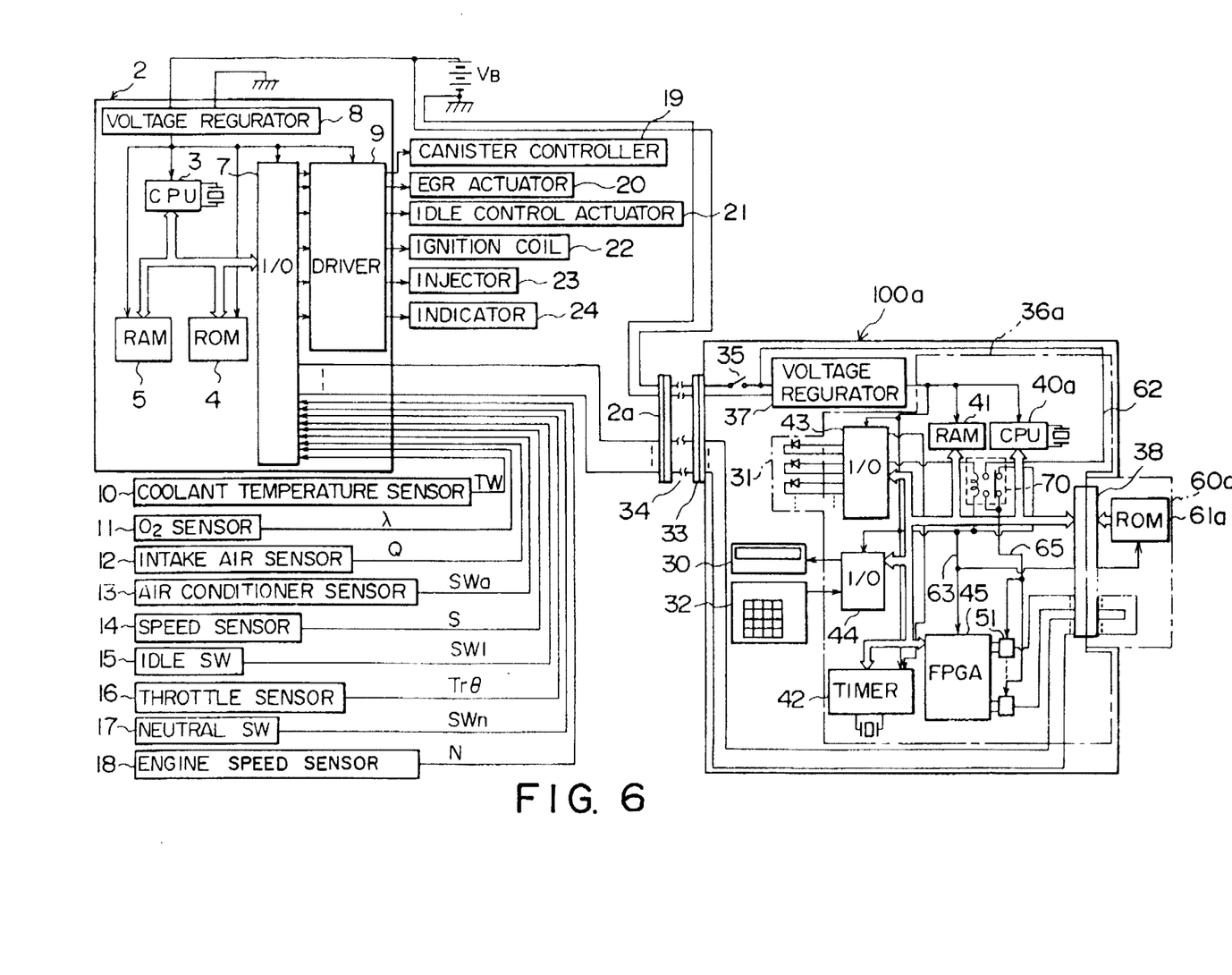
FIG. 6 shows circuit block diagrams of the electronic control unit and the diagnosis equipment as the second preferred embodiment according to the present invention.

As shown in FIG. 6, diagnosis equipment 100a has a switch 70 for switching power lines 62 (12 V) and 63 (5 V) and connecting the switched line to a power line. The switch 70 provided in the diagnostic equipment 100a corresponds to the switch 64 of the memory cartridge 60 in the first embodiment. Other components of the diagnostic equipment 100a are the same as those of the diagnostic equipment 100 in FIG. 2.

In the second embodiment, the control system of the diagnostic equipment 100a has a supply voltage of 5 volts and that of the ECU 2 has a supply voltage either of 5 or 12 volts. The power line 62 (12 V) is connected to a power line connected to the voltage regulator 8 of the ECU 2 via switch 35. This connection is made when the supply voltage on the ECU 2 side is not 12 volts.

A controller 36a of the diagnosis equipment 100a has a relay with two circuits as the switch 70 in FIG. 6. The two circuits are connected separately at their contacts to the power lines 62 (12 V) and 63 (12 V). Both other contacts of the circuits are connected to a power line 65 of the interface cells 51. A relay coil of the relay 70 is connected at its one end to the power line 63 (12 V). The relay coil is further connected at its other end to the I/O interface 43. The relay 70 is switched in response to the signal level of the communications system on the automobile to connect either of the power lines 62 (12 V) and 63 (12 V) to the power line 65 of the interface sells 51.

For this purpose, a ROM 61a of a memory cartridge 60a stores several programs for a CPU 40a and FPGA 45. The programs for the CPU 40a are a diagnostic boot program, a diagnostic program for the ECU 2 of a specific automobile, etc. The ROM 61a further stores data on a supply voltage supplied to the control system installed in automobile.

Figure 7:
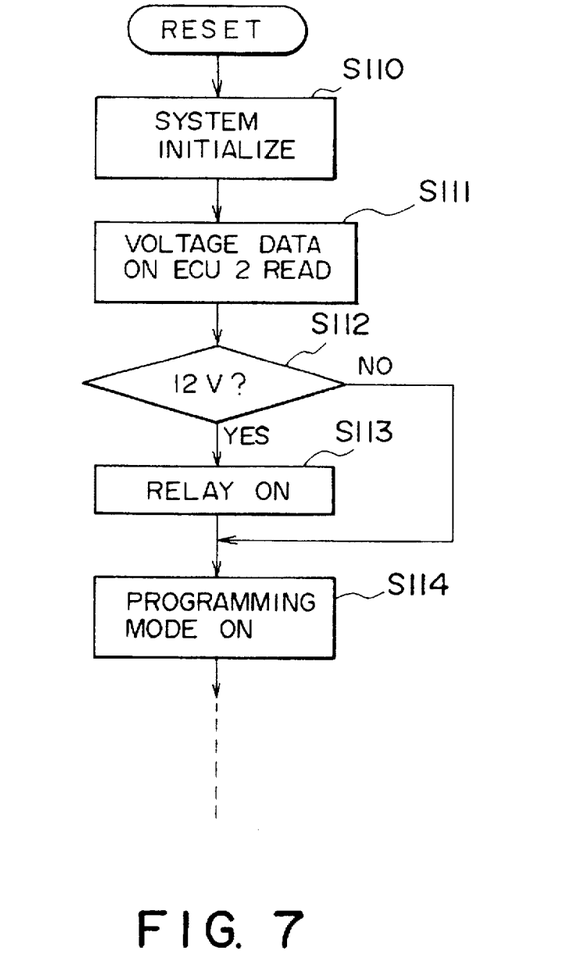
FIG. 7 is a flowchart explaining the process of data communication and diagnosis in the second embodiment, showing only the different portion from the process shown in FIG. 5.

The flowchart shown in FIG. 7 will describe the process of data communication and diagnosis operation in the second embodiment. FIG. 7 only shows a part of the process including STEPS S110 to S114. STEPS S110 and S114 respectively correspond to STEPS S101 and S102 in FIG. 5.

Other parts (not shown) of the process after STEP S114 in the second embodiment are the same as those after STEP S102 in FIG. 5. Further, the process will be described in FIG. 7 under the situation that the power line 63 (5 V) has been connected to the power line 65 of the interface cells 51 as shown in FIG. 6.

In STEP S110, the system is initialized. Then, in STEP Sill, data on a supply voltage to the ECU 2 on the automobile 200 is read out of the ROM 61a of the memory cartridge 60a. A check is made in STEP S112 whether the supply voltage is 12 volts or 5 volts.

The process goes to STEP 113 when the supply voltage is 12 volts. The relay 70 is energized in STEP S113 to disconnect the power line 63 (5 V) and connect the power line 62 (12 V) to the power line 65 of the interface cells 51. Then, in STEP S114, reprogramming of the FPGA 45 starts.

The relay 70 remains unergized when the supply voltage is 5 volts in STEP S112. The power line 63 (5 V) has been connected to the power line 65 of the interface cells 51. The process thus jumps to STEP S114 to start the reprogramming of the FPGA 45. The process after STEP S114 is the same as that shown in FIG. 5 after STEP S102.

As described above, also the diagnosis equipment according to the second embodiment can be used for any electronic control units. The electronic control units may have different communications protocols with different data formats, transmission and reception timings, etc., and different signal levels. There is no need for preparing other diagnosis equipment with different hardware for communications protocols and signal levels of the electronic control units. This achieves highly efficient diagnostic operations and lower costs for production of the diagnosis equipment and diagnostic operations.

While the presently preferred embodiments of the present invention have been shown and described, it is to be understood these disclosures are for the purpose of illustration and that various changes and modifications may be made without departing from the scope of the invention as set forth in the appended claims.

What is claimed is:

1. A diagnosis system selectively connected to an electronic control unit installed in a motor vehicle for data communication, comprising:

a memory, a processor in association with the memory storing a diagnostic program for a particular type of car to be tested for issuing a request signal directed to the electronic control unit and processing a reply data signal transmitted from the electronic control unit in response to the request signal;

a plurality of interface cells interposed between the processor and the electronic control unit for converting a voltage level of the request signal from the processor to a voltage level of the electronic control unit and a voltage level of the reply data signal from the electronic control unit to a voltage level of the processor; and switching means for switching a property of the interface cells so as to enable the diagnosis system to be used with electronic control units operating under different voltage levels.

2. The diagnosis system according to claim 1, wherein the switching means is installed in a detachable cartridge having the memory operatively connected to the processor, the switching means being formed to switch the property of the interface cells to match a voltage level of an electronic control unit mounted on the particular type of car.

3. The diagnosis system according to claim 1, wherein the switching means is a jumper wire.

4. The diagnosis system according to claim 1, wherein the switching means is a wiring pattern.

5. The diagnosis system according to claim 1, wherein the switching means is a relay.

* * * * *